US011718997B2

(12) United States Patent
Robin

(10) Patent No.: US 11,718,997 B2
(45) Date of Patent: Aug. 8, 2023

(54) SENSOR INTENDED TO EMIT AN INFORMATION SIGNAL

(71) Applicant: SOMFY ACTIVITES SA, Cluses (FR)

(72) Inventor: Serge Robin, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 17/790,443

(22) PCT Filed: Dec. 30, 2020

(86) PCT No.: PCT/FR2020/052638
§ 371 (c)(1),
(2) Date: Jun. 30, 2022

(87) PCT Pub. No.: WO2021/136916
PCT Pub. Date: Jul. 8, 2021

(65) Prior Publication Data
US 2023/0041037 A1     Feb. 9, 2023

(30) Foreign Application Priority Data

Dec. 31, 2019  (FR) ..................... 19/15793

(51) Int. Cl.
*E04F 10/06*     (2006.01)
*H04Q 9/02*      (2006.01)
*G01P 13/00*     (2006.01)

(52) U.S. Cl.
CPC .......... *E04F 10/0659* (2013.01); *H04Q 9/02* (2013.01); *G01P 13/00* (2013.01);
(Continued)

(58) Field of Classification Search
CPC ......... E04F 10/0659; H04Q 9/02; G01P 13/00
See application file for complete search history.

(56) References Cited

U.S. PATENT DOCUMENTS 6,798,158 B2 *   9/2004  Evans ................. E04F 10/0659
                                                   160/59
7,389,806 B2 *   6/2008  Kates ....................... E06B 9/68
                                                   160/310
(Continued)

FOREIGN PATENT DOCUMENTS

EP         1939832 A1      7/2008

OTHER PUBLICATIONS

International Search Report for International Application No. PCT/FR2020/052638; Date of Completion: Apr. 1, 2021; dated Apr. 16, 2021; 5 Pages.

(Continued)

*Primary Examiner* — Albert K Wong
(74) *Attorney, Agent, or Firm* — Cantor Colburn LLP

(57) ABSTRACT

Sensor intended to be positioned on a mobile portion of a deployable structure, and to emit an information signal to a transmission unit intended to be positioned on a fixed portion of the deployable structure, such that the sensor comprises a wireless emitter/receiver configured to receive an incident signal originating from the transmitting unit when the deployable structure is in a folded position; a processing logic unit adapted to decide on the emission of the information signal to the transmission unit by the wireless emitter/receiver; a standalone energy source configured to power the processing logic unit.

20 Claims, 2 Drawing Sheets

(52) U.S. Cl.
CPC . *H04Q 2209/823* (2013.01); *H04Q 2209/826* (2013.01); *H04Q 2209/88* (2013.01); *H04Q 2209/883* (2013.01)

(56) References Cited

U.S. PATENT DOCUMENTS

| | | | | |
|---|---|---|---|---|
| 8,179,062 | B2* | 5/2012 | Germain | E05F 15/40 318/560 |
| 8,261,608 | B2* | 9/2012 | Schoen | E04F 10/0659 160/3 |
| 8,424,378 | B2* | 4/2013 | Mugnier | E06B 9/56 73/170.01 |
| 8,887,785 | B2* | 11/2014 | Goth | G05B 19/0428 160/7 |
| 10,100,814 | B1* | 10/2018 | Taylor | F03D 9/25 |
| 10,939,155 | B2* | 3/2021 | Sallas | H04L 12/2812 |
| 11,395,030 | B2* | 7/2022 | Sallas | H04N 21/814 |
| 2007/0240831 | A1* | 10/2007 | Tran | B60P 3/343 160/67 |
| 2008/0150717 | A1 | 6/2008 | Guillemot et al. | |
| 2009/0125148 | A1* | 5/2009 | Koot | G05B 19/042 700/275 |

OTHER PUBLICATIONS

Translation of International Search Report for International Application No. PCT/FR2020/052638; Date of Completion: Apr. 1, 2021; dated Apr. 16, 2021; 2 Pages.

Translation of Written Opinion for International Application No. PCT/FR2020/052638; dated Apr. 16, 2021; 9 Pages.

Written Opinion for International Application No. PCT/FR2020/052638; dated Apr. 16, 2021; 9 Pages.

* cited by examiner

[Fig. 1]
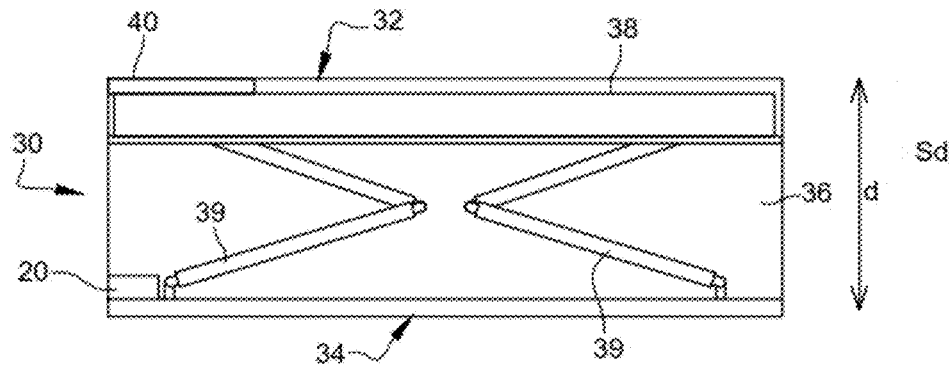
[Fig. 2]
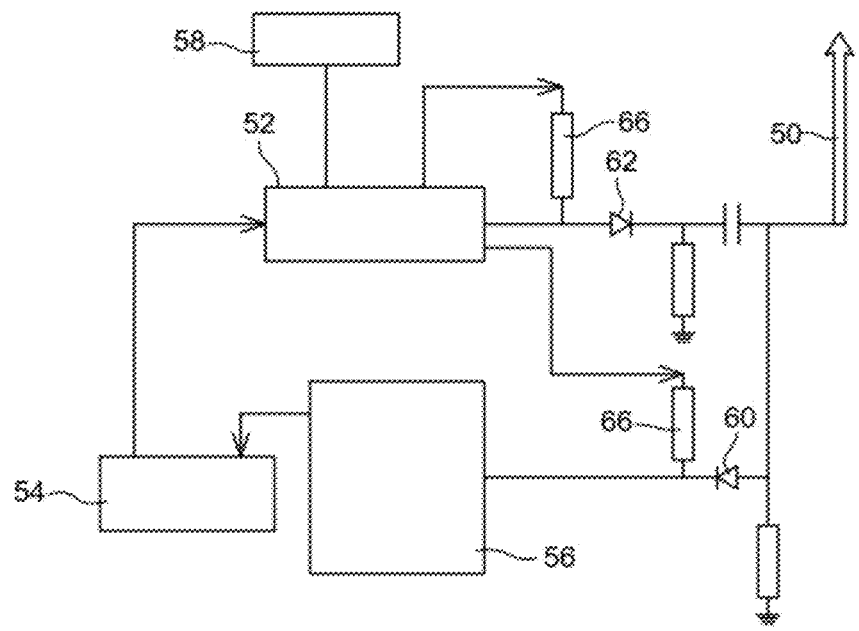

[Fig. 3]
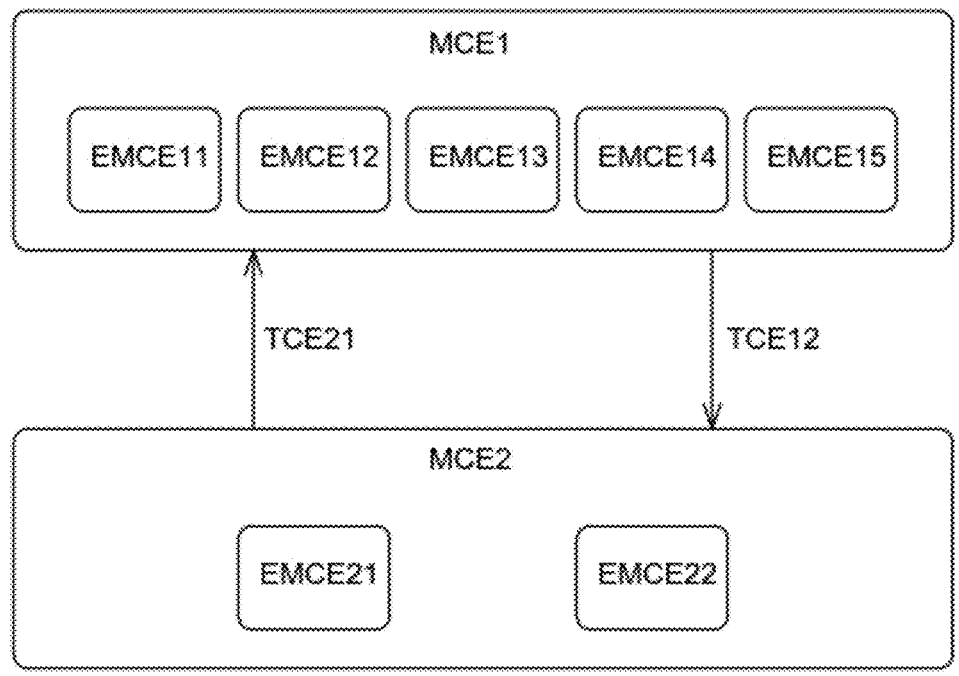
[Fig. 4]
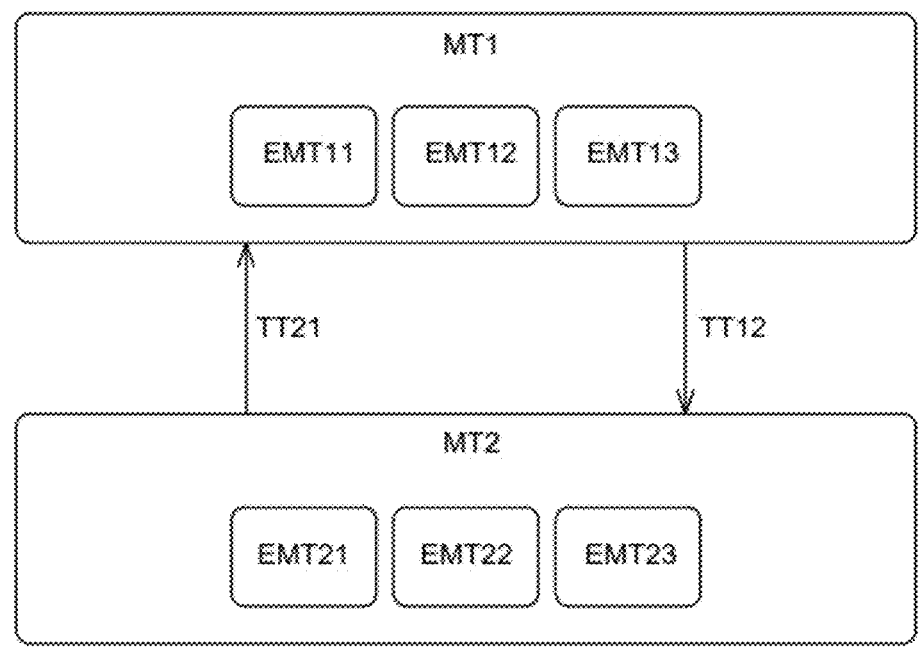

SENSOR INTENDED TO EMIT AN INFORMATION SIGNAL

CROSS REFERENCE TO RELATED APPLICATIONS

This application is a National Stage of PCT Application No. PCT/FR2020/052638 filed on Dec. 30, 2020, which claims priority to French Patent Application No. 19/15793 filed on Dec. 31, 2019, the contents each of which are incorporated herein by reference thereto.

TECHNICAL FIELD

The present invention relates to the field of motorized deployable structures in a home automation installation, such as a motorized blind for example or more generally solar protection. More particularly, the present invention relates to a sensor comprising a wireless emitter so as to transmit a security signal.

BACKGROUND

In a known manner, the document EP1939832 describes a device disposed on a motorized blind. Said device comprises a battery, an accelerometer and is configured to send a security signal when a movement is detected by the accelerometer. Such an arrangement makes it possible to adjust the blind according to the detected movements and in particular to fold up the blind to secure it in the event of strong wind.

Nonetheless, this solution has limitations.

Indeed, the use of a battery makes it necessary to periodically replace it, or to provide a dimensioning adapted to power over a long period both the movement detection means and the means for emitting a security signal.

The present invention aims at solving all or part of the aforementioned drawbacks.

BRIEF SUMMARY

To this end, the present invention concerns a sensor intended to be positioned on a mobile portion of a deployable structure, and to emit an information signal to a transmission unit positioned on a fixed portion of the deployable structure, such that the sensor comprises:
- a wireless emitter/receiver configured to receive an incident signal originating from the transmission unit according to a first operating mode
- a standalone energy source;
- a converter configured to convert the incident signal into an electric current and to charge the standalone energy source using said electric current.
- a logical processing unit adapted to decide on the emission of the information signal to the transmission unit by the wireless emitter/receiver according to a second operating mode, the standalone energy source being configured to power the logical processing unit, the first operating mode corresponding to the operation of the sensor in a folded position of the deployable structure, the second operating mode corresponding to the operation of the sensor in a deployed position of the deployable structure.

Thanks to the arrangements described hereinabove, the sensor constitutes an energy reserve by means of the standalone energy source in the folded position of the deployable structure in the charging mode, in order to be able to reuse this reserve in the deployed position of the deployable structure in the detection and emission mode.

According to one embodiment, the transition from the first operating mode to the second operating mode may be controlled during the deployment of the deployable structure. In particular, the transition may be triggered by a signal from the movement detection unit. Alternatively, a specific wake-up signal sent by the transmission unit may trigger this transition, following a detection of a deployment movement by the transmission unit. The transition from the second operating mode to the first operating mode may be controlled during the folding up of the deployable structure. Thus, when a distance threshold is reached, the transmission unit may begin to emit an incident signal which triggers for the sensor to switch to the first operating mode.

Of course, a plurality of positions may be taken by the deployable structure. It may be agreed that a folded position corresponds to a position in which a distance between a proximal end and the distal end of said deployable structure is lower than a first threshold, and that a deployed position corresponds to a position in which the distance between the proximal end and the distal end of said deployable structure is greater than second threshold. The first and second thresholds may be distinct or identical. The considered threshold(s) may also correspond to one or several distance threshold(s) between a transmission unit and the sensor.

According to one embodiment, the converter is configured to convert a radiofrequency signal into a current.

Such an arrangement allows the converter of the sensor to convert the incident signal into an electric current and thus charge the standalone energy source when the deployable structure is in the folded position.

According to one embodiment, the converter is configured to generate a binary signal for the logical processing unit.

According to one embodiment, the value of the generated binary signal depends on the reception state of the incident signal.

According to one embodiment, the deployable structure is a deployable element of any kind such as an awning for example.

According to one embodiment, an information signal is of any kind, such as a security signal comprising an alert for example.

According to one embodiment, the sensor comprises a detection unit. The detection unit may be of different types. In particular, the detection unit may be a movement detection unit, a capacitive or inductive detection unit, or even a touch-sensitive detection unit of any type. According to another possibility, the detection unit could be a luminosity or sunshine detection unit.

According to one embodiment, the sensor comprises a movement detection unit configured to detect the movements of the deployable structure, the logical processing unit being configured to decide on the emission of the information signal based on the movements of the deployable structure detected by the movement detection unit.

According to one embodiment, a threshold between the deployed position and the folded position of the deployable structure is determined according to the quantity of electric current resulting from the conversion of the incident signal.

Such an arrangement makes it possible to detect abnormal movements of the deployable structure and to send an information signal to the transmission unit when abnormal movements of the deployable structure are detected.

According to one embodiment, the threshold is determined according to the quantity of electric current resulting from the conversion of the incident signal.

Such an arrangement makes it possible to save energy. Indeed, the transmission unit does not send an incident signal if the electric current resulting from the conversion of said incident signal is too low.

According to one embodiment, the sensor is configured to send a state signal comprising at least one piece of information on the state of the sensor at a regular interval when the deployable structure is in the deployed position.

According to one embodiment, the state signal comprises the amount of energy remaining in the standalone energy source. Such an arrangement allows the transmission unit to know the state of the sensor.

According to one embodiment, the sensor is configured to send a charging signal comprising at least one piece of information on the state of the standalone energy source when the deployable structure is in the folded position.

Such an arrangement allows the transmission unit to no longer send an incident signal when the charging signal indicates that the standalone energy source is sufficiently charged. Therefore such an arrangement makes it possible to save energy.

According to one embodiment, the charging signal is sent when the standalone energy source is fully charged.

According to one embodiment, the charging signal is sent at a regular interval.

According to one embodiment, the first operating mode is the default operating mode of the sensor.

According to one embodiment, the sensor is configured to make it possible to carry out the charging of the standalone energy source from the conversion of an incident signal in the absence of power supply.

The invention also concerns an assembly comprising a sensor intended to be positioned on a mobile portion of a deployable structure and a transmission unit positioned on a fixed portion of the deployable structure, in which the transmission unit is configured to send a position change control signal of the deployable structure to an actuator, the actuator being configured to displace said deployable structure to a folded position from a deployed position.

According to one embodiment, the transmission unit is configured to send the control signal upon reception of the information signal originating from the sensor.

According to one embodiment, the transmission unit is configured to send the control signal upon reception of the information signal originating from the sensor.

According to one embodiment, the transmission unit is configured to send the control signal when said transmission unit no longer receives a state signal originating from the sensor.

The invention also concerns a method for controlling a sensor intended to be positioned on a mobile portion of a deployable structure, the supply method being executed by the sensor and comprising:
 a first operating mode corresponding to a charging mode, the sensor carrying out the following steps:
  reception of an incident signal, the incident signal originating from a transmission unit positioned on a fixed portion of the deployable structure;
  conversion of the incident signal into an electric current; and
  charging of a standalone energy source of the sensor using the electric current resulting from the conversion of the incident signal; and
 a second operating mode corresponding to a detection and emission mode, the sensor carrying out the following steps:
  emission of an information signal intended to the transmission unit;
 the first operating mode corresponding to the operation of the sensor in a folded position of the deployable structure, the second operating mode corresponding to the operation of the sensor in a deployed position of the deployable structure.

According to one implementation, in the second operating mode, the sensor carries out the following step:
 emission of a state signal to the transmission unit comprising a piece of information on an amount of energy remaining in the standalone energy source of the sensor.

According to one implementation, in the first operating mode, the sensor carries out the following step:
 emission of a piece of information of charging to the transmission unit indicating the level of charge of the standalone energy source.

According to one implementation, in the first operating mode, the sensor carries out the following step:
 entering a sleep mode if the charge of the standalone energy source is completed.

According to one implementation, in the second operating mode, the sensor carries out emission of an information signal to the transmission unit in the event of detection of a movement of the deployable structure.

According to one embodiment, the incident signal includes one or several of the following information:
 a synchronization pattern with synchronization of the control device with the emission device;
 a header comprising a protocol version identifier allowing the emission device to designate to the control device the used transmission protocol;
 data such as a network address corresponding to the receiving device, for example; and/or
 a checksum enabling the correct transmission of the data to be checked.

According to one embodiment, the incident signal and the configuration instruction are transmitted according to the Bluetooth protocol, and more specifically, "Bluetooth Advertising".

The various non-incompatible aspects defined hereinabove may be combined.

BRIEF DESCRIPTION OF THE DRAWINGS

The invention will be even better understood using the detailed description that is disclosed hereinbelow with regards to the appended drawings in which:

FIG. 1 represents a deployable structure on which is disposed a transceiver in accordance with the present invention.

FIG. 2 represents an electrical diagram of a sensor in accordance with the present invention.

FIG. 3 represents an implementation of a method for controlling a sensor in accordance with the present invention.

FIG. 4 is a flowchart representing an embodiment of an operating method of a sensor according to the invention.

DETAILED DESCRIPTION

FIG. 1 represents, as an example of a deployable structure 30, a motorized patio blind. The deployable structure comprises a fixed portion 32 forming a proximal end of the deployable structure intended to be fixed to a support such as a building wall, a fabric 36 which is attached to a load bar 34 forming a distal end of the deployable structure, a motorized rolling tube 38 arranged to roll up the fabric 36, the motorized rolling tube 38 being positioned on the fixed portion 32, as well as articulated arms 39 which are provided with springs, and make it possible to exert a force on the load bar 34 against the action of the motorized rolling tube so as to keep the fabric 36 tight.

The winding or unwinding of the fabric 36 on the motorized rolling tube 38 makes it possible to displace the load bar, the articulated arms and the fabric between at least one folded position of the deployable structure and at least one deployed position.

The mobile structure is associated with an assembly comprising a transmission unit 40 positioned on the fixed portion 32 and a sensor 20, fixed on the load bar 34.

Of course, a plurality of positions may be taken by the deployable structure. It may be agreed that a folded position corresponds to a position in which a distance d between the proximal end 32 and the distal end 34 of said deployable structure 30 is less than a first threshold Sd, and that a deployed position corresponds at a position in which the distance d between the proximal end 32 and the distal end 34 of said deployable structure 30 is greater than a second threshold Sd. The first and second thresholds may be distinct or identical. This example uses a single threshold Sd. The considered threshold(s) may also correspond to distance threshold(s) between a transmission unit 40 and the sensor 20.

FIG. 2 represents an electrical diagram of the sensor 20. In particular, the sensor comprises a wireless emitter/receiver 50 configured to receive an incident signal originating from the transmission unit 40 and to emit an information signal to said transmission unit 40, a logical processing unit 52 adapted to decide on the emission of an information signal to the transmission unit 40 by the wireless emitter/receiver 50 and an standalone energy source 54 such as a ultracapacitor or a supercapacitor configured to power the logical processing unit 52. The information signal emitted by the wireless emitter/receiver 50 may in particular be a security signal comprising an alert according to which a movement detection unit 58 included in the sensor 20 has detected a critical vibration. Such an arrangement makes it possible to detect abnormal movements of the deployable structure 30.

The sensor 20 also comprises a converter 56 configured to convert the incident signal into an electric current and to power the standalone energy source 54 using said electric current. Indeed, the converter 56 receives the incident signal, which is a radio signal, and converts it into a direct current, thus making it possible to recharge the standalone energy source 54. Such an arrangement makes it easier to charge said standalone energy source 54 and thus to reduce its size.

According to one embodiment, the converter 56 is also configured to generate a binary signal intended for the logical processing unit 52. The generated binary signal depends on the reception state of the incident signal.

According to one embodiment, when an incident signal is received by the wireless emitter/receiver 50 and the converter 56 converts said incident signal into an electric current, the converter 56 generates a binary signal intended for the logical unit treatment 52, equal to one. Conversely, when converter 56 does not convert any incident signal, said converter generates a binary signal equal to zero.

According to one embodiment, the generated binary signal intended for the logical processing unit 52 is read by said logical processing unit according to a determined interval such as for example every 20 ms. Such an arrangement makes it possible to send a configuration message comprising one or several pieces of information through one or more incident messages.

Thus, a frame is formed from a succession of binary signals which may contain a wake-up signal (WAKE-UP), a synchronization pattern, a header (HEADER), data (DATA) and a verification code (CRC-4).

According to one possibility, the wake-up signal comprises four signals equal to 1, so as to provide sufficient energy to process the upcoming signals.

Upon reception of an information signal, the transmission unit 40 is configured to send a control signal to an actuator 38, comprising for example the motorized rolling tube 38, in order to cause the deployable structure 30 to switch from a deployed position to a folded position. Such a configuration makes it possible to fold up the mobile structure 30 and thus reduce its wind resistance. Such an arrangement makes it possible to limit the risks of degradation of said mobile structure.

According to one possibility, the information signal is only sent to the transmission unit 40 by the wireless emitter/receiver 50 when the deployable structure 30 is in the deployed position. Indeed, when the deployable structure 30 is in the folded position, it is not necessary to obtain vibration information since the mobile structure has already reduced its wind resistance.

The incident signal is sent by the transmission unit 40 only when the deployable structure 30 is in the folded position. Indeed, it is in this position that the incident signal has sufficient power to be converted into an electric current by the converter 56. The threshold allowing to differentiate the deployed position from the folded position is determined according to the amount of electric current resulting from the conversion of the incident signal. Such an arrangement saves energy. Indeed, the transmission unit 40 does not send an incident signal if the electric current resulting from the conversion of said incident signal is too low.

According to one possibility, the transmission unit 40 may obtain position information from the deployable structure, and therefore from the sensor 20 through the actuator 38. Indeed, the actuator knows the position of the sensor 20, for example by a prior learning of the stroke ends for the motor actuator in its normal operation.

The sensor 20 is configured to send a state signal comprising a piece of information on the amount of energy remaining in the standalone energy source of the sensor 20 at regular intervals when the deployable structure 30 is in the deployed position. Such an arrangement allows the transmission unit 40 to know the state of the sensor. Such an arrangement allows the transmission unit 40 to send a control signal in order to place the deployable structure 30 in the folded position in order to charge the standalone energy source 54 of the sensor 20 when the latter only comprises a small amount of energy, and in particular if the transmission unit no longer receives a state signal.

The sensor 20 is configured to send a charging signal comprising at least one piece of information on the state of the standalone energy source 54 when the deployable structure 30 is in the folded position. Such an arrangement allows the transmission unit 40 to no longer send an incident signal when the charging signal indicates that the standalone energy source is sufficiently charged. Therefore such an arrangement makes it possible to save energy.

The charging signal is sent either when the standalone energy source 54 is fully charged, or at regular intervals.

As illustrated in FIG. 2, the sensor 20 is configured to receive and convert the incident signal even when the logical processing unit is switched off. Indeed, the wireless emitter/receiver 50 is electrically connected to a first diode 60, said first diode 60 being configured to be conductive in the direction of reception of the incident signal. The wireless emitter/receiver 50 is also electrically connected to a second diode 62, said second diode being configured to be conductive in the signal emission direction. The first diode 60 is electrically connected to the converter 56 while the second diode 60 is electrically connected to the logical processing unit 52. In other words, the wireless emitter/receiver 50 is passively connected to the converter 56. Such an arrangement allows the incident signal to be automatically directed to the converter 56, and this even when the logical processing unit 52 is switched off. Such an arrangement makes it possible to obtain an electric current to power the logical processing unit 52 and to send a signal even without an internal power supply to the control device.

The sensor 20 also comprises variable resistors 66 controlled by the logical processing unit 52 making it possible to electrically isolate the wireless emitter/receiver 50 from the converter 56. Such an arrangement makes it possible not to convert the received signals and thus to be able to read them.

FIG. 3 represents an embodiment of a control method of the sensor 20 or an operating method. The sensor has several distinct operating modes.

According to a first operating mode MCE1 corresponding to a charging mode, the sensor may carry out the following steps:
- reception EMCE11 of an incident signal originating from the transmission unit 40;
- conversion EMCE12 of the incident signal into an electric current; and
- charging EMCE13 of the standalone energy source 54 of the sensor 20 using the electric current resulting from the conversion of the incident signal.

According to the first operating mode MCE1, the sensor 20 may also carry out a step of emitting a piece of information of charging EMCE14 indicating the level of charge of the standalone energy source. This step may be periodic or carried out when the level of charge of the standalone energy source 54 reaches a predetermined value, corresponding for example to full charge.

According to the first operating mode MCE1, the sensor 20 may also carry out a step of entering a sleep mode EMCE15 if the charging of the standalone source is completed.

Thus, in the first operating mode MCE1, the standalone energy source 54 of the sensor 20 may be fully charged following the reception of several frames of incident signal converted into energy. A piece of information on the level of charge is sent to the transmission unit 40 to stop sending frames. The sensor 20 is entered in a sleep mode, which corresponds to a standby mode while waiting to switch to the second operating mode MCE2.

According to a second operating mode MCE2 corresponding to a detection and emission mode, the sensor 20 carries out the following steps:
- a step of emitting an information signal MCE21 to the transmission unit 40, in particular in the event of detection of a critical movement 58;
- a step of emitting a state signal MCE22 comprising a piece of information on the amount of energy remaining in the standalone energy source 54 of the sensor 20;

The first operating mode MCE1 corresponds to the nominal operation of the sensor in a folded position of the folded structure, that is to say when the distance between the proximal end 32 and the distal end 34 of said deployable structure 30 is less than the threshold Sd.

The second operating mode MCE2 corresponds to the nominal operation of the sensor in a deployed position of the deployable structure, that is to say when the distance between the proximal end 32 and the distal end 34 of said deployable structure 30 is greater than the threshold Sd.

The transition TCE12 from the first operating mode MCE1 to the second operating mode MCE2 may be controlled during the deployment of the deployable structure. In particular, the transition TCE12 may be triggered by a signal from the movement detection unit 58. Alternatively, a specific wake-up signal corresponding for example to a radiofrequency frame or to an energy frame sent by the transmission unit 40 may trigger this transition. As previously indicated, the position of the sensor 20 and the exceeding of the threshold Sd is accessible to the actuator 38 associated with the transmission unit 40.

The transition TCE21 from the second operating mode MCE2 to the first operating mode MCE1 may be controlled during the folding up of the deployable structure. As previously indicated, the position of the sensor 20 and the exceeding of the threshold Sd is accessible to the actuator 38 associated with the transmission unit 40. Thus, when the threshold Sd is reached, the transmission unit may begin to emit a incident signal which triggers for the sensor 20 the transition to the first operating mode.

FIG. 4 represents an embodiment of a method for controlling the transmission unit 40 or an operating method. The transmission unit has several distinct operating modes.

According to a first operating mode MT1 corresponding to a charging mode, the transmission unit 40 carries out:
- a step of emitting EMT11 a signal to the sensor 20, this signal corresponding to the energy incident signal received by the sensor in step EMCE11;
- a step of receiving a piece of information of charging EMT12 indicating the level of charge of the standalone energy source of the sensor 20;
- a possible step of entering in sleep mode EMT13 the emission if the charging of the standalone source is completed.

According to a second operating mode MT2 corresponding to a detection and reception mode, the transmission unit 40 carries out the following steps:
- a step of receiving an information signal EMT21 at the transmission unit 40, in particular in the event of detection of a critical movement 58;
- a step of receiving a state signal EMT22 comprising a piece of information on the amount of energy remaining in the standalone energy source 54 of the sensor 20;
- a possible step of folding controlling of the deployable structure EMT23 if one of the reception steps indicates a critical movement or a low charge of the sensor 20.

The first operating mode MT1 corresponds to the nominal operation of the sensor in a folded position of the folded structure, that is to say when the distance between the proximal end 32 and the distal end (34) of said deployable structure 30 is less than the threshold Sd.

The second operating mode MT2 corresponds to the nominal operation of the sensor in a deployed position of the deployable structure, that is to say when the distance between the proximal end 32 and the distal end 34 of said deployable structure 30 is greater than the threshold Sd.

The transition TT12 from the first operating mode MT1 to the second operating mode MT2 may be controlled during the deployment of the deployable structure. The transition TT21 from the second operating mode MT2 to the first operating mode MT1 may be controlled during the folding of the deployable structure. As previously indicated, the position of the sensor 20 and the exceeding of the threshold Sd is accessible to the actuator 38 associated with the transmission unit 40. Thus, when the threshold Sd is reached, the transmission unit may pass from one operating mode to another.

By default, the sensor goes into charging mode. This allows the assembly to operate even if the sensor's standalone energy source is completely discharged.

As an example, the distance threshold to switch to the charging mode may be a few tens of cm. In particular, the sensor and the transmission unit may be separated by less than 50 cm, in particular by a distance of the order of 20 to 30 cm. The distance threshold corresponds in particular to the distance between the antenna of the sensor and the antenna of the transmission unit. The transmission unit may for example continuously emit, in the charging operating mode, a power of a few tens of mW. As an example, the charging may be carried out in a few minutes or even a few tens of minutes for a day of autonomy with an emission every 15 minutes of a state signal to bear witness to its presence and some information frames, indicating for example a vibration, every day.

According to one possibility, a configuration step may be carried out to optimize the emission power of the sensor according to the distance to the motor and the disturbances which may exist locally. This makes it possible to adapt the energy consumption to communicate between the sensor and the motor.

Of course, the invention is not limited to the embodiments represented and described hereinbefore, but on the contrary covers all variants thereof. In particular, the invention would be applicable to other types of deployable structures such as blinds with adjustable slats.

The invention could for example be applicable to a motorized rolling shutter, or to an exterior Venetian blind, to which would be associated a sensor preferably placed on a slat located on the lower portion of the shutter. This may be an anti-intrusion sensor capable of detecting a movement corresponding to an attempt to raise a roller shutter apron or the slats of an exterior Venetian blind, or a sunshine sensor which could inform an entire home automation installation on the level of sunshine outside. Of course other types of sensors could be imagined using detection units of distinct types. In this example, the transmission unit would be associated with a drive motor for the roller shutter placed in the center of the rolling tube of the shutter, or with a drive motor of the slats of an exterior Venetian blind placed on the upper portion of the blind. In the same way as with the embodiment of the blind, the sensor may be recharged when the shutter is raised if the distance between the transmission unit and the sensor is less than a threshold Sd.

The invention could also be applied to an interior solar protection of the roller blind or Venetian blind type, for example. In this example a sensor may be placed on the lower portion of the blind and in particular on the load bar. The sensor may be a sensor comprising a movement detection unit capable of detecting a shock corresponding to an order to raise or lower the blind, or a detection unit comprising touch-sensitive keys constituting a control keyboard enabling the user to control the movement of the blind. In the same way as in the previous examples, the transmission unit is associated with an actuator allowing the blind to be moved. The transmission unit could in this case also transmit the energy to the sensor present in the lower portion of the blind when the latter is in the folded position.

The invention claimed is:

1. A sensor intended to be positioned on a mobile portion of a deployable structure, and to emit an information signal to a transmission unit positioned on a fixed portion of the deployable structure, such that the sensor comprises:
   a wireless emitter/receiver configured to receive an incident signal originating from the transmission unit according to a first operating mode;
   a standalone energy source;
   a converter configured to convert the incident signal into an electric current and to power the standalone energy source using said electric current;
   a logical processing unit adapted to decide on the emission of the information signal to the transmission unit by the wireless emitter/receiver according to a second operating mode, the standalone energy source being configured to power the logical processing unit;
   the first operating mode corresponding to the operation of the sensor in a folded position of the deployable structure, the second operating mode corresponding to operation of the sensor in a deployed position of the deployable structure.

2. The sensor according to claim 1, such that the sensor comprises a movement detection unit configured to detect movements of the deployable structure, the logical processing unit being configured to decide on the emission of the information signal based on the movements of the deployable structure detected by the movement detection unit.

3. The sensor according to claim 1, such as a threshold between the deployed position and the folded position of the deployable structure is determined depending on a quantity of electric current resulting from the conversion of the incident signal.

4. The sensor according to claim 1, such as the sensor is configured to send a state signal comprising at least one information on a state of the sensor at a regular interval when the deployable structure is in the deployed position.

5. The sensor according to claim 1, such as the sensor is configured to send a charging signal comprising at least one information on a state of the standalone energy source when the deployable structure is in the folded position.

6. The sensor according to claim 1, wherein the first operating mode is a default operating mode of the sensor.

7. An assembly comprising a sensor and a transmission unit positioned on a fixed portion of a deployable structure, wherein the transmission unit is configured to send a position change control signal of the deployable structure to an actuator, the actuator being configured to displace said deployable structure towards a folded position from a deployed position, wherein the sensor is intended to be positioned on a mobile portion of the deployable structure, and to emit an information signal to a transmission unit positioned on a fixed portion of the deployable structure, the sensor comprising:
   a wireless emitter/receiver configured to receive an incident signal originating from the transmission unit according to a first operating mode;
   a standalone energy source;
   a converter configured to convert the incident signal into an electric current and to power the standalone energy source using said electric current;
   a logical processing unit adapted to decide on emission of the information signal to the transmission unit by the wireless emitter/receiver according to a second operating mode, the standalone energy source being configured to power the logical processing unit;

the first operating mode corresponding to the operation of the sensor in a folded position of the deployable structure, the second operating mode corresponding to operation of the sensor in a deployed position of the deployable structure.

8. The assembly according to claim 7, such as the transmission unit is configured to send the control signal upon reception of the information signal originating from the sensor.

9. The assembly according to claim 7, such as the transmission unit is configured to send the control signal when said transmission unit no longer receives a state signal originating from the sensor.

10. A method for controlling a sensor intended to be positioned on a mobile portion of a deployable structure, the method being executed by the sensor and comprising:
a first operating mode corresponding to a charging mode, the sensor carrying out the following steps:
receiving of an incident signal, the incident signal originating from a transmission unit positioned on a fixed portion of the deployable structure;
conversion of the incident signal into an electric current; and
charging of a standalone energy source of the sensor using the electric current resulting from the conversion of the incident signal; and
a second operating mode corresponding to a detection and emission mode, the sensor carrying out the following steps:
emission of an information signal to the transmission unit;
the first operating mode corresponding to operation of the sensor in a folded position of the deployable structure, the second operating mode corresponding to operation of the sensor in a deployed position of the deployable structure.

11. The method according to claim 10, wherein, in the second operating mode, the sensor carries out the following step:
emission of a state signal to the transmission unit comprising an information on a quantity of energy remaining in the standalone energy source of the sensor.

12. The method according to claim 10, wherein, in the first operating mode, the sensor carries out the following step:
emission of a charging information to the transmission unit indicating a level of charge of the standalone energy source.

13. The method according to claim 10, wherein, in the first operating mode, the sensor carries out the following step:
entering a sleep mode state if a charge of the standalone energy source is completed.

14. The method according to claim 10, wherein, in the second operating mode, the sensor carries out transmission of the information signal to the transmission unit upon detection of a movement of the deployable structure.

15. The sensor according to claim 2, such as a threshold between the deployed position and the folded position of the deployable structure is determined depending on a quantity of electric current resulting from the conversion of the incident signal.

16. The sensor according to claim 2, such as the sensor is configured to send a state signal comprising at least one information on a state of the sensor at a regular interval when the deployable structure is in the deployed position.

17. The sensor according to claim 2, such as the sensor is configured to send a charging signal comprising at least one information on a state of the standalone energy source when the deployable structure is in the folded position.

18. The sensor according to claim 2, wherein the first operating mode is a default operating mode of the sensor.

19. The sensor according to claim 3, such as the sensor is configured to send a state signal comprising at least one information on a state of the sensor at a regular interval when the deployable structure is in the deployed position.

20. The sensor according to claim 3, such as the sensor is configured to send a charging signal comprising at least one information on a state of the standalone energy source when the deployable structure is in the folded position.

* * * * *